(12) United States Patent
Chen et al.

(10) Patent No.: US 9,572,454 B2
(45) Date of Patent: Feb. 21, 2017

(54) RAPID PREPARATION METHOD OF HIGH-QUALITY HOT WATER

(75) Inventors: Xiaoming Chen, Zhejiang (CN); Chengze Chen, Zhejiang (CN)

(73) Assignee: Xiaoming Chen, Ningbo, Zhejiang (CN)

( * ) Notice: Subject to any disclaimer, the term of this patent is extended or adjusted under 35 U.S.C. 154(b) by 458 days.

(21) Appl. No.: 14/241,438

(22) PCT Filed: Jul. 15, 2012

(86) PCT No.: PCT/CN2012/078667
§ 371 (c)(1),
(2), (4) Date: Feb. 26, 2014

(87) PCT Pub. No.: WO2013/029435
PCT Pub. Date: Mar. 7, 2013

(65) Prior Publication Data
US 2014/0226960 A1    Aug. 14, 2014

(30) Foreign Application Priority Data

Aug. 26, 2011 (CN) .......................... 2011 1 0255464
Mar. 9, 2012 (WO) ................ PCT/CN2012/072140

(51) Int. Cl.
*A47J 31/00* (2006.01)
*A47J 31/54* (2006.01)
*C02F 1/02* (2006.01)

(52) U.S. Cl.
CPC ................ *A47J 31/545* (2013.01); *C02F 1/02* (2013.01)

(58) Field of Classification Search
None
See application file for complete search history.

(56) References Cited

U.S. PATENT DOCUMENTS

| | | | | |
|---|---|---|---|---|
| 5,845,504 A * | 12/1998 | LeBleu | ................ | B01D 5/0072 62/285 |
| 6,460,735 B1 * | 10/2002 | Greenwald | ............. | A47J 31/50 222/145.5 |
| 8,530,798 B2 * | 9/2013 | Aldana Arjol | ....... | H05B 1/0269 219/448.11 |
| 8,997,511 B2 * | 4/2015 | Berrio | ................... | F24D 11/004 122/19.1 |
| 2002/0130137 A1 * | 9/2002 | Greenwald | ............. | A47J 31/50 222/54 |

(Continued)

FOREIGN PATENT DOCUMENTS

CN     102068206     5/2011

*Primary Examiner* — Thor Campbell

(57) ABSTRACT

A rapid preparation method of high-quality hot water, includes steps of: a) calculating a temperature difference between an inlet water temperature and an predetermined outlet water temperature, determining an adjacent heating power pair from heating curves of the pipeline heater according to the temperature difference and a predetermined flow rate, wherein the heating power pair is corresponding to one of time points in a slow nonlinear heating area K, then selecting the heating power pair for preparing to heat water in the pipeline heater; and b) inputting the water with the predetermined flow rate into the pipeline heater, heating with one of the heating power pair selected in the step a) in such a manner that the water in the pipeline heater is heated according to the K area of the pipeline heater, obtaining the water with the target water temperature from an outlet.

10 Claims, 3 Drawing Sheets

(56) References Cited

U.S. PATENT DOCUMENTS

| | | | |
|---|---|---|---|
| 2004/0069768 A1* | 4/2004 | Patterson | G01K 7/42 219/492 |
| 2006/0231551 A1* | 10/2006 | Ruther | F24C 7/087 219/707 |
| 2010/0005825 A1* | 1/2010 | Yui | B67D 3/0032 62/389 |
| 2011/0215114 A1* | 9/2011 | Liccioni | B67D 3/0032 222/146.6 |
| 2011/0284585 A1* | 11/2011 | Stewart-Barnett | B67D 3/0009 210/232 |
| 2013/0062366 A1* | 3/2013 | Tansey | A47J 31/44 222/102 |
| 2013/0192293 A1* | 8/2013 | Davis | B67D 3/0009 62/389 |
| 2014/0223938 A1* | 8/2014 | Davis | B67D 3/0009 62/157 |
| 2015/0108051 A1* | 4/2015 | Davis | B67D 3/0009 210/97 |
| 2015/0238045 A1* | 8/2015 | Hansen | A47J 31/369 99/295 |
| 2016/0083242 A1* | 3/2016 | Groesbeck | B67D 3/0009 222/146.2 |
| 2016/0207751 A1* | 7/2016 | Groesbeck | B67D 1/0004 |
| 2016/0220922 A1* | 8/2016 | Kamen | B01D 1/28 |

* cited by examiner

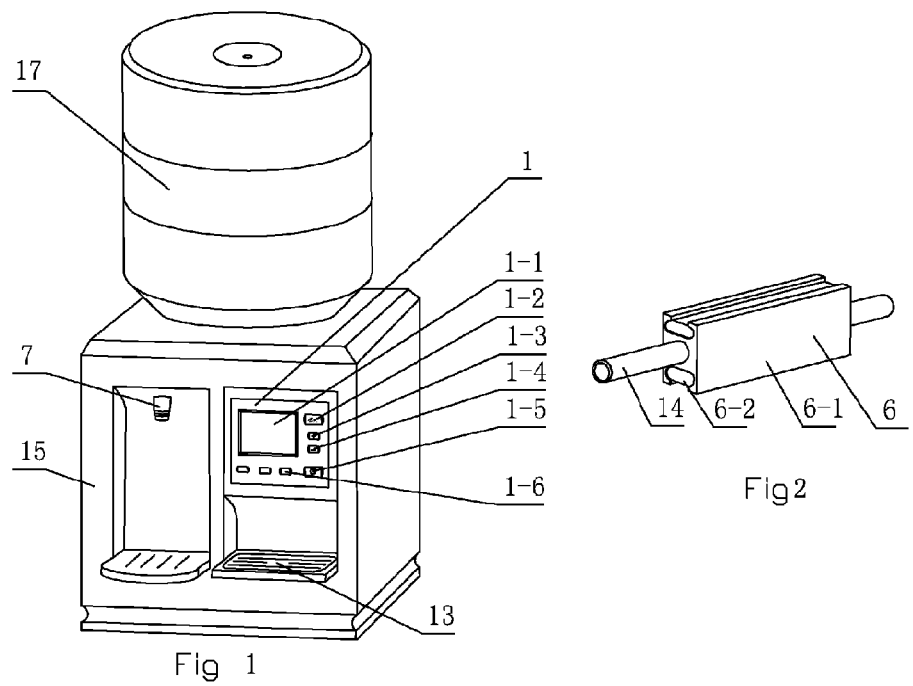
Fig 1
Fig 2
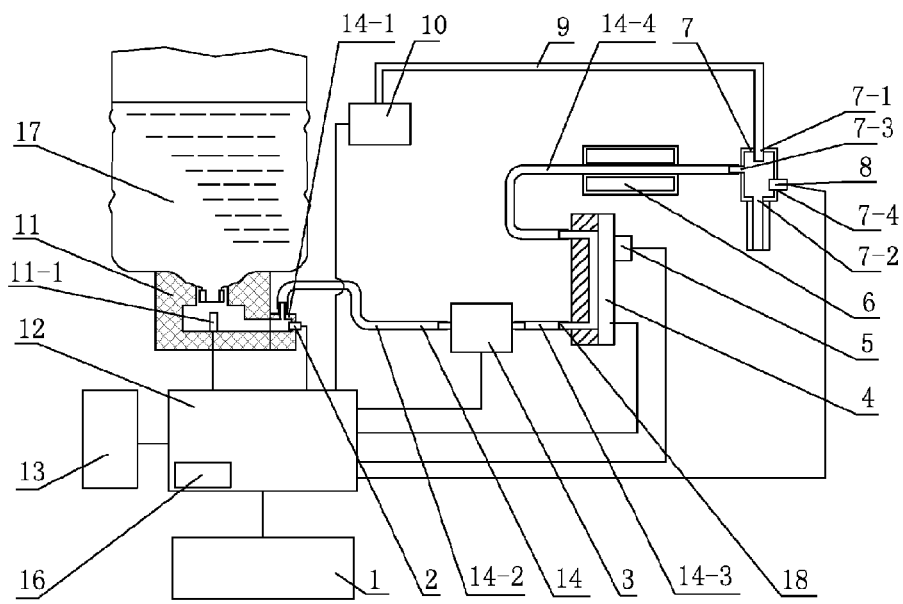
Fig 3

RAPID PREPARATION METHOD OF HIGH-QUALITY HOT WATER

CROSS REFERENCE OF RELATED APPLICATION

This is a U.S. National Stage under 35 U.S.C 371 of the International Application PCT/CN2012/078667, filed Jul. 15, 2012, which claims priority under 35 U.S.C. 119(a-d) to CN 201110255464.3, filed Aug. 26, 2011 and PCT/CN2012/072140, filed Mar. 9, 2012.

BACKGROUND OF THE PRESENT INVENTION

Field of Invention

The present invention relates to a preparation method of hot water and a preparation device, and more particularly to a rapid preparation method of high-quality hot water and a preparation device thereof.

Description of Related Arts

With the continuous improvement of people's living standards, there is an urgent need to quickly obtain high-quality hot water for improving the quality of life, such as utilizing the high-quality hot water for tea, coffee, etc. The high-quality hot water should be quickly obtained while the original water is not boiled too much, the original molecule structure is not damaged, and the high quality of the original water is maintained.

Patent Application CN 201010207530.5, Pipeline electric heating rapid hot water machine, disclosed a hot water machine which is able to provide 95~99° C. hot water within 3~5 s, wherein an amount of the water to be heated can be predetermined and energy is saved as well as time. However, disadvantage of the hot water machine is that due to slow response speed of the NTC (negative temperature coefficient) thermistor utilized by the pipeline heater for feeding back temperature information, information lag and temperature control difficulty will be caused by a response time more than 1 s. Inlet water temperatures also have great differences according to the different seasons and different environments. Because of temperature control lag, outlet water temperature of the rapid hot water machine is instable, and even steam will be sprayed because the water temperature is too high, which not only is likely to scald people, but also reduces the lifetime of the machine. At the meantime, because of the destruction of the micro molecule of overheated water and decrease of oxygen content, it is difficult to make high-quality and mellow tea with the too hot water.

Patent Application CN 201110009740.8, Tea machine with heating pipe, solves a problem that the water in the heating pipes is easily to be over heated and vaporized due to boiling, in such a manner that the water splashes to scald people and damages the machine. The Patent Application provides a method for obtaining hot water with a target temperature from the outlet and a tea machine utilizing the hot water. However, the predetermined heating temperature is still based on the water temperature of the outlet and the water is heated by each segment of the heating pipe for reaching the predetermined heating temperature. The segmental pipe heater according to the method is difficult to be produced. Each segment of the heater has a constant high temperature. Lag of the NTC thermistor is still not compensated. Therefore, water heating procedure is still not able to be precisely controlled and the quality of the hot water cannot be guaranteed.

SUMMARY OF THE PRESENT INVENTION

An object of the present invention is to provide a rapid preparation method of high-quality hot water and a preparation device thereof for overcoming the above disadvantages, in such a manner that a pipeline heater works at a slow heating area, a temperature of the pipeline heater will not be too high, an original water molecule structure is less damaged, and a water temperature of an outlet is maintained at a target temperature.

Accordingly, in order to accomplish the above object, the present invention provides a rapid preparation method of high-quality hot water, wherein a heating curve thereof is based on a heating curve of a pipeline heater; a flow rate of an electromagnetic pump is set to L1; a vertical coordinate temperature T refers to a difference between a target water temperature Tm and an inlet water temperature $T_j$; a horizontal coordinate refers to a heating time t; the heating curves are respectively drawn with different electric powers of P1, P2, P3, P4, etc. for forming a rapid liner heating area S and a slow nonlinear heating area K; the K area extends to $t_2$, wherein the $t_2$=single-time water output amount/L1; two of the adjacent heating curves are also called an electric power pair, an area enclosed in the K area by the electric power pair is a heating area of the target water temperature; wherein the rapid preparation method comprises steps of:

a) detecting the inlet water temperature from the electromagnetic pump by an inlet water temperature sensor, selecting the electric power pair corresponding to a target water temperature area with a main control board according to the target water temperature and the heating curve for preparing to heat;

b) heating before inputting water, detecting a temperature of a heating body in the pipeline heater by a heating body sensor on the pipeline heater, converting the temperature to a water temperature in the pipeline heater by the main control board, determining a value of a heating time limitation for electric heating, and starting the pipeline heater for heating with the heating time limitation in such a manner that the water in the pipeline heater is heated to a temperature close to the Tm;

c) starting the electromagnetic pump by the main control board in such a manner that the water with the flow rate of L1 is outputted from a drink water tank and inputted into the pipeline heater, heating according to one of the heating curve of the electric power pair selected in the step a) by the main control board at a same time in such a manner that the water with the flow rate of L1 is heated according to the heating curve in the K area for avoiding the S area and obtaining water for tea with a temperature close to the target water temperature from an outlet;

d) automatically adjusting the electric power by the heating body sensor according to the heating curve during heating, wherein if the pipeline heater is working with the target water temperature between the heating curves of the electric power pair selected in the step a) and the water temperature in the pipeline heater is higher than the target water temperature, the main control board automatically switches the heating curve towards the lower heating curve of the electric power pair; if the water temperature in the pipeline heater is lower than the target water temperature, the main control board automatically switches the heating curve towards the higher heating curve of electric power pair; in such a manner that an outlet water temperature of the pipeline heater reaches the target water temperature Tm; and e) calculating an electrical drive pulse number of the electromagnetic pump according to a target amount of the water by the main control board, starting counting when the water is outputted, stopping heating when the electrical drive pulse number is reached, then stopping the electromagnetic pump after 2 s for stopping outputting the water, or pushing an operation button before the electrical drive pulse number is reached for stopping heating, then stopping the electromagnetic pump after 2 s for stopping outputting the water in advance.

The present invention also provides a preparation device of high-quality hot water, comprising:
 a control button panel mounted on a surface of a shell;
 a main control board mounted inside the shell;
 a pipeline heater with a heating body sensor mounted thereon;
 a plurality of water pipes;
 power source;
 an electromagnetic pump; and
 a drink water tank with a safe guard;
 wherein an inlet of the pipeline heater is connected to the water pipe with an inlet water temperature sensor through the electromagnetic pump, the water pipes are connected to the drink water tank, an output of the pipeline heater is connected to a water pipe end with an outlet water temperature sensor, a signal input terminal of the main control board is respectively connected to the inlet water temperature sensor, the outlet water temperature sensor and the heating body sensor, an electric power output terminal of the main control board is respectively connected to the electromagnetic pump and the pipeline heater.

By ignoring a particular water inlet device and a particular controller, a method for defining the heating curve when a flow rate of the pipeline heater is constant, comprises a step of: respectively detecting and drawing the heating curves reflecting a relationship of time and temperatures with different heating powers of the pipeline heater when the flow rate of the pipeline heater is set to L1, wherein a vertical coordinate temperature T refers to a difference between an outlet water temperature Tm and an inlet water temperature $T_j$; a horizontal coordinate refers to a heating time t; with different heating powers, a rapid liner heating area of the heating curve forms an S area and the slow nonlinear heating area forms the K area.

Preferably, the heating time of the K area is $t_2$, in such a manner that a water amount requirement of the rapid water preparation is met while a cost and a time for detecting the heating curve of the pipeline heater are saved. Preferably, the heating time is more than $t_2$.

Preferably, a changing range of the temperature difference between the adjacent heating curves is 3~7° for decreasing a requirement for response speed of the water temperature sensor as well as smoothing water temperature control.

Preferably, the present invention provides a rapid preparation method of high-quality hot water, comprising steps of:
 a) calculating a temperature difference between an inlet water temperature and an predetermined outlet water temperature, determining an adjacent heating power pair from heating curves of the pipeline heater according to the temperature difference and a predetermined flow rate, wherein the heating power pair is corresponding to one of time points in a slow nonlinear heating area K, then selecting the heating power pair for preparing to heat water in the pipeline heater; and
 b) inputting the water with the predetermined flow rate into the pipeline heater, heating with one of the heating power pair selected in the step a) in such a manner that the water in the pipeline heater is heated according to the K area of the pipeline heater, obtaining the water with the target water temperature from an outlet.

Preferably, the rapid preparation method further comprises a step of:
 c) detecting a water temperature in the pipeline heater at first, calculating a heating time with the selected heating power according to a difference between the water temperature and the target water temperature as well as a volume of the water in the pipeline heater, decreasing the heating time by a certain time for obtaining an actual heating time, setting the heating power according to the actual heating time for heating the water in the pipeline heater, then heating according to the step b).

Preferably, for precisely controlling the water temperature, the rapid preparation method further comprises a step of:
 d) during heating, selecting the lower heating power of the heating power pair in the step a) for heating if the water temperature in the pipeline heater is higher than the target water temperature; selecting the higher heating power of the heating power pair for heating if the water temperature in the pipeline heater is lower than the target water temperature; in such a manner that an outlet water temperature of the pipeline heater is close to the target water temperature.

Preferably, in the step a), the adjacent heating power pair is corresponding to one of time points in the slow nonlinear heating area K.

Preferably, in the step c), the water temperature in the pipeline heater is able to be directly detected by the water temperature sensor. The water temperature is also able to be detected by: detecting a relationship of a temperature of the heating body of the pipeline heater and the water temperature of the outlet, and representing the water temperature in the pipeline heater by the water temperature of the outlet, then inverting the detected temperature of the heating body to the water temperature in the pipeline heater.

Preferably, in the step c), the selected power is a half of a rated power of the pipeline heater for ensuring that the water temperature in the pipeline heater is close to a temperature corresponding to an end time of a rapid heating segment.

Preferably, in the step c), the certain time is a half of a ratio of a pipeline heater length and the flow rate for ensuring that from the pipeline heater beginning to rapidly heat to the water beginning to flow, the water temperature is still in the rapid heating area, and the water temperature is smoothly increased after the water begins to flow.

According to the present invention, because the heating curves of the pipeline heater are obtained under certain conditions, the heating curves are affected by a variety of factors. The factors are analyzed as follows.

Referring to FIG. 6 of the drawings, the pipeline heater is considered as a black box with a water inlet GA, a water outlet GB, an electric power $P_{in}$ and an input terminal GC. Water with a predetermined flow rate L is gradually heated by a heating part of the pipeline heater during flowing from the GA to the GB, the heated water is obtained at the GB.

According to energy conservation law, an identity of a water temperature $T_c$ of the GB and a water temperature $T_R$ of the GA is: $C \times L \times (T_c - T_R) = \times P_{in}$, wherein the C is specific heat capability of the water, the L is the predetermined flow rate, the is electrothermal conversion efficiency when the pipeline heater works with the selected $P_{in}$.

The $P_{in}$ is discretized for obtaining $P_1, P_2, P_3 \ldots P_n$, which is regarded as constant during heating procedures. As a result, the above equation is transformed to: $T_{ic} - T_R = {}_i \times P_n / (C \times L)$ (i=1, 2, 3, ... n), wherein $T_{ic}$ is the water temperature of the outlet of the pipeline heater, is the electrothermal conversion efficiency when the pipeline heater works with the given $P_i$.

In the above equation, the specific heat C will be slightly changed according to quality change of the water. During heating, the C is able to be regarded as a constant, which is 4.18 J. By selecting a pump module, the flow rate L is able to be well controlled. During operation, the L is able to be regarded as a constant. The $P_i$, which is determined by circuit controlling, is also able to be regarded as a constant.

In the equation 1: $C \times L \times (T_c - T_R) = \times P_{in}$, when $T_c = T_{ic}$ and $=_i$, an equation 2 is obtained: $(T_{ic} - T_R)/(T_{jc} - T_R) =_i P_i/_j P_{j(i \neq j)}$).

However, changes of using environments will affect a value of the $_i$. The pipeline heater using a thick-film resistor as the heating part is provided as an example for illustrating reasons which affect the $_i$.

The $\eta_i$ is a ratio of an effective heating power $P_{il}$ and the input power $P_i$, and $\eta_i = P_{il}/P_i$.

The pipeline heater input electric power $P_i = P_{il} + P_{i\Sigma}$, wherein the $P_{il}$ is an effective power which is converted into water heat, the $P_{i\Sigma}$ total power dissipation.

The $P_{i\Sigma}$ the total power dissipation comprising electrothermal conversion dissipation $P_{iZ}$ of the thick-file resistor of the pipeline heater, conduction-convection and radiation heating power $P_{iF}$ of a cooling surface of the pipe heater, and heat capacity dissipation $P_{iB}$ which is determined by a pipeline heater structure of the pipeline heater. The $P_{i\Sigma}$ illustrated by an equation 3: $P_{i\Sigma} = P_{iZ} + P_{iF} + P_{iB}$, wherein the $P_{iZ}$ gradually increases with increase of using time of the thick-film resistor, and the $P_{iF}$ changes according to an ambient temperature; for example, temperature increase of air around the cooling surface of the pipe heater will lead to decrease of the $P_{iF}$ and increase of the $\eta_i$.

The heat capacity dissipation $P_{iB}$ of the pipe heater body structure is in proportion to the increase value of the heating body temperature. When the heating body temperature changes from low to high, the $P_{iB} > 0$, in such a manner that the decreases; when the heating body temperature changes from high to low, the $P_{iB} < 0$, in such a manner that the $\eta_i$ increases.

Because $dT_{ic}/d\eta_i > 0$, with the selected power $P_i$, the increase or decrease of the dissipation $P_{i\Sigma}$ lead to decrease or increase of the $\eta_i$, in such a manner that a heating value of the outlet decreases or increases.

By rewriting the equation 1 as $T_{ic} - T_R = \eta_i \times P_i/(4.18 \times L)$, it can be seen that the $P_i$ heating curve obtained in the experiment will move up and down along the T vertical coordinate with changes of the Meanwhile, a phenomenon that a difference between the $P_{i-1}$ and $P_i$ will be larger or smaller is explained. The equation is applicable to each detected $P_i$ heating curve.

For example: test conditions are an ambient temperature of 25° C., supply voltage $V_o$, AC 220V, a grid internal resistance $R_s$ of 2Ω, a thick-film resistor $P_1$ of 20Ω of the pipeline heater and an inlet water temperature $T_R = 10°$ C., wherein $L = L_1 = 5.5$ ml/s. When $P_1 = 2200$ w and $P_2 = 1925$ w, values corresponding to $T_c - T_R$ at a time of $t_2$ are $T_1 = 87°$ C. and $T_2 = 81°$ C. According to $T_{1c} - T_R = \eta_1 \times P_1/(4.18 \times L) = 87°$ C. and $T_{2c} - T_R = \eta_2 \times P_2/(4.18 \times L) = 81°$ C., the corresponding $\eta_i$ is $\eta_1 = 0.91$ and $\eta_2 \times 0.96$. When the heating time $t > t_1$, the target water temperature of 97° C. is within the heating power pair curve nonlinear area K comprising the $P_1$ and the $P_2$.

Supposing that the $\eta_i$ changes by 3% due to change of the when $P_{i\Sigma}$, when $P_1 = 2200$ w, then $T_1 = [84.1, 89.9]°$ C. according to $T_{1c} - T_R = \eta_1 \times P_1/(4.18 \times L)$; when $P_2 = 1925$ w, then $T_2 = [78.5, 83.5]°$ C. according to $T_{2c} \times T_R = \eta_2 \times P_2/(4.18 \times L)$. Because the inlet water temperature $T_R = 10°$ C., the $T_{1c}$ is 94.1~99.9° C., and the $T_{2c}$ is 88.5~93.5° C.

In the above example, if the $\eta_i$ is decreased by 0.03 due to increase of the $P_{i\Sigma}$, which leads to a highest outlet water temperature $T_{1c} = 94.1°$ C. and $T_{2c} = 88.5°$ C., the target water temperature of 97° C. is outside the heating power pair curve nonlinear area K comprising the $P_1$ and the $P_2$.

When $\Delta\eta_i = 0$, $T_1 = 87°$ C. and $T_2 = 81°$ C., the related difference between the $P_1$ and the $P_2$ is $T_{1c} - T_{2c} = 6°$ C. When $\Delta\eta_i = -0.03$, $T_{1c} - T_R = 84.1 < T_1$, and $T_{2c} - T_R = 78.5 < T_2$, the related heating power pair curve comprising the $P_1$ and the $P_2$ moves down. As a result, $T_{1c} - T_{2c} = 5.6°$ C., and related difference of the $P_1$ and the $P_2$ is decreased. When $\Delta\eta_i = +0.03$, $T_{1c} - T_R = 89.9°$ C.$> T_1$, and $T_{2c} - T_R = 83.5°$ C.$> T_2$, the related heating power pair curve comprising the $P_1$ and the $P_2$ moves up. As a result, $T_{1c} - T_{2c} = 6.4°$ C., related difference between the $P_1$ and the $P_2$ is increased.

Furthermore, the grid internal resistance $R_s$, the grid nominal voltage $V_o$ and the load resistor $R_1$ will also affect the constant value of the selected $P_i$, which is illustrated as follows.

When the pipe heater is connected to the grid, because of costs, impacts on the constant value of the $P_i$ caused by changes of a grid environment are not able to be filtered in most cases. For example, referring to FIG. 7 of the drawings, a schematic view of the pipe heater accessing to the grid is illustrated, wherein $R_s$ is internal resistance of a power transformer and equivalent loss resistance from the power transformer to a client, the $R_s$ changes according to an amount of power consumption, a typical value thereof is of ohm magnitude, for example, $R_s = 2Ω$; $R_1$ is the thick-film resistor of the pipe heater, a value thereof is classified into two states: cold resistance at a room temperature and thermal resistance after heating.

For an Hy-1 pipe heater, the cold resistance thereof detected at the room temperature is $R_1 = 20Ω$, or the thermal resistance after heating is $R_1 = 21Ω$ ($P_i = 2200$ W after 15 s), wherein the $V_o$ is the regional power grid nominal voltage.

The input pipe heater electric power $P_i = V_i^2/2R_1 = (V_o R_1)^2/(2R_1(R_1 + R_s)^2)$.

Changes of the $V_o$, $R_1$ and $R_s$ will affect a value of the heating power $P_i$, and:

because $dP_i/d R_s < 0$, increase of the $R_s$ will lead to decrease of the $P_i$, decrease of the $R_s$ will lead to increase of the $P_i$;

because $dP_i/d R_s > 0$, increase of the $R_s$ will lead to increase of the $P_i$, decrease of the $R_s$ will lead to decrease of the $P_i$; and because $dP_i/d V_o > 0$, increase of the $V_o$ will lead to increase of the $P_i$, decrease of the $V_o$ will lead to decrease of the $P_i$.

Clearly, in the equation 1: $T_{ic} - T_R =_i \times P_i/(4.18 \times L)$, change of the $P_i$ is in proportion to the heating value T.

Impacts on the $P_i$ when the $P_i$ is change to 3% due to changes of the $V_o$ the $R_s$, and the $R_1$ are illustrated as follows.

For example: test conditions are the ambient temperature of 25° C., the supply voltage $V_o$, AC 220V, the power network internal resistance $R_s$ of 2Ω, the thick-film resistor $R_1$ of 20Ω of the pipeline heater and the inlet water temperature $T_R = 10°$ C., wherein $L = L_1 = 5.5$ ml/s. When $P_1 = 2200$ w and $P_2 = 1925$ w, and the $V_o$, the $R_s$ as well as the $R_1$ matching with the experimental conditions cause $\Delta P_i = 0$, the heating values at the outlet GB as illustrated in FIG. 5, which is corresponding to $T_{1c} - T_R$ at a time of $t_2$, are $T_1 = 87°$ C. and $T_2 = 81°$ C. According to $T_{1c} - T_R = \eta_1 \times P_1/(4.18 \times L) = 87°$ C. and $T_{2c} - T_R = \eta_2 \times P_2/(4.18 \times L) = 81°$ C., the corresponding $\eta_i$ is $\eta_1=0.9$ and $\eta_2=0.96$. When the heating time $t>t_1$, the target water temperature of 97° C. is within the heating power pair curve nonlinear area K comprising the $P_1$ and the $P_2$.

Supposing that the changes of the $V_o$, the $R_s$ and the $R_1$ do not meet the test conditions, in such a manner that $\Delta P_1 \leq 2200 \times 3\% = 66$ W and $\Delta P_2 \leq 1925 \times 3\% = 57.8$ W; according to the equation 1 and the equation 2, when the $P_1=2200$ w, an outlet temperature range according to $T_{1c}-T_R=\eta_1 \times P_1/(4.18 \times L)$ is T=[84.4, 89.6]° C.; when the $P_2=1925$ w, the outlet temperature range according to $T_{2c}-T_R=\eta_2 \times P_2/(4.18 \times L_0)$ is T=[78.6, 83.4].

If the inlet water temperature $T_R=10°$ C., the $\Delta P_1$ keeps a highest water temperature $T_{1c}$ of the outlet GB between 94.4~99.6° C.; the $\Delta P_2$ keeps a highest water temperature $T_{2c}$ of the outlet GB between 88.6~93.4° C.

In the above example, when the $P_i$ is decreased by 3% due to the changes of the $V_o$, the $R_s$ and the $R_1$, in such a manner that the $P_1$ is decreased by 66 W and the $P_2$ is decreased by 57.8 W, which leads to a highest outlet water temperature $T_{1c}=94.39°$ C. and $T_{2c}=88.6°$ C., the target water temperature of 97° C. is outside the heating power pair curve nonlinear area K comprising the $P_1$ and the $P_2$.

When the $\Delta P_i=0$, the temperature value $T_1=87°$ C., $T_2=81°$ C., the related difference between the $P_1$ and the $P_2$ is $T_{1c}-T_{2c}=97-91=6°$ C.

When the $\Delta P_1=+66$ w, the $\Delta P_2=+57.8$ w, $T_{1c}-T_R=89.6°$ C.$>T_1$, and $T_{2c}-T_R=83.4°$ C.$>T_2$, the related heating power pair curve comprising the $P_1$ and the $P_2$ moves up. As a result, $T_{1c}-T_{2c}=99.6-93.4=6.2°$ C., and related difference of the $P_1$ and the $P_2$ is increased. When $\Delta P_1=-66$ w, the $\Delta P_2=-57.8$ w, $T_{1c}-T_R=84.4°$ C.$<T_1$, and $T_{2c}-T_R=78.6°$ C.$<T_2$, the related heating power pair curve comprising the $P_1$ and the $P_2$ moves down. As a result, $T_{1c}-T_{2c}=94.4-88.6=5.8°$ C., related difference between the $P_1$ and the $P_2$ is decreased.

In summary, it is discovered by study that the heating curve obtained with the certain flow rate and the selected $P_i$ of the pipeline heater will move up and down along the T vertical coordinate, and the difference between the $P_{i-1}$ and $P_i$ will be larger or smaller. As a result, under certain experiment conditions, the detected heating curve of the pipe heater under a using condition will be changed to be different from the heating curve obtained with original experiment conditions, and even a maximum heating temperature is not able to reach the target temperature. Therefore, the original heating method needs to be improved.

Thus, detected values of the heating curve of the pipe heater under different flow rates are added for changing the heating curve as follows. The flow rate of the pipeline heater is set to $L_j$ (j=0, 1, 2, 3, . . . n). When setting the $L_j$, the heating curves, which reflects a relationship of time and temperatures with different heating powers $P_i$ of the pipeline heater, are detected and drawn, wherein a vertical coordinate temperature T refers to a difference between the outlet water temperature $T_c$ and the inlet water temperature $T_R$; a horizontal coordinate refers to a heating time t. With the different heating powers $P_i$, the rapid heating segment of the heating curve forms the S area and the slow heating segment forms the K area. A max power of the pipeline heater, the heating time $t_2$, and a highest heating value $TH_j$ with the flow rate $L_j$ are defined for obtaining a series of the heating curves under the different flow rates.

A max value of the highest heating value $TH_j$ is 96° C. for meeting all using requirements.

A procedure of obtaining the adjacent power pair by the heating variable T is called capturing. Because of the change of the using condition, for determining a suitable adjacent power pair more accurately and better controlling the water temperature, a capture formula utilized during capturing is $T=T_{cm}-T_R+x$, wherein the $T_{cm}$ is a target outlet water temperature, the $T_R$ is the inlet water temperature, the x is a compensation value.

Therefore, a rapid preparation method of high-quality hot water is provided, comprising steps of:

a) calculating a heating variable T according to $T=T_{cm}-T_R+x$, wherein the $T_R$ and the x are predetermined constants, then determining a flow rate $L_j$ according to a series of heating curves of a pipeline heater, wherein the $L_j$ satisfies $T \leq TH_j$;

b) inputting water with the flow rate $L_j$ into the pipeline heater, then obtaining the heating variable T according to a heating curve pair of the pipeline heater, wherein the heating curve pair is corresponding to the $L_j$, determining an adjacent heating power pair from heating curves of the pipeline heater, wherein the heating power pair is corresponding to one of time points in a slow nonlinear heating area K, then heating with one heating power of the heating power pair; and c) detecting a water temperature $T_c$ in the step b) from a water outlet of the pipeline heater; calculating a temperature difference between a target water temperature $T_{cm}$ of the water outlet and the water temperature of the water outlet when $t \geq t_1$, wherein the temperature difference $y=T_{cm}-T_c$; comparing the y to a max allowable discrepancy $C_p$ of the target water temperature, increasing the y by the original compensation value x when $|y|>C_p$ for obtaining a new compensation value x, then providing the step a) and the step b); providing the step b) if $|y|<C_p$.

Preferably, for keeping the initial outlet water temperature close to the target water temperature, the step b) comprises a step of:

d) detecting a water temperature $T_{sh}$ in the pipeline heater at first, calculating a heating time with the selected heating power according to a difference between the target water temperature $T_{cm}$ and the $T_{sh}$ as well as a volume of the water in the pipeline heater, decreasing the heating time by a certain time for obtaining an actual heating time, setting the heating power according to the actual heating time for heating the water in the pipeline heater, in such a manner that the water temperature in the pipeline heater is close to a temperature corresponding to an end time $t_1$ of a rapid heating segment.

Preferably, a starting time of the x in the step c) is $t_1'=t_1(T_{cm}-T_{sh})/(T_{cm}-T_R)$.

For better controlling the water temperature, the rapid preparation method further comprises a step of:

e) during heating in the step b), selecting the lower heating power of the heating power pair in the step b) for heating if the water temperature in the pipeline heater is higher than the target water temperature; selecting the higher heating power of the heating power pair for heating if the water temperature in the pipeline heater is lower than the target water temperature; in such a manner that an outlet water temperature of the pipeline heater is close to the target water temperature.

For optimizing a real-time performance of capturing, an inlet water temperature sensor is added. The inlet water temperature sensor is provided in a water inlet device. In the above steps b), an actual measured value from the inlet water temperature sensor is utilized as the inlet water temperature $T_R$ of the capture formula: $T=T_{cm}-T_R+x$.

A preparation device of high-quality hot water is provided according to the above preparation method, comprising:

a water inlet device;
a water outlet device;
a controller;
an outlet water temperature sensor;
a pipeline heater; and
a metering pump;
wherein an inlet of the pipeline heater is connected to the water inlet device through the metering pump, an output of the pipeline heater is connected to the water outlet device with the outlet water temperature sensor, a signal input terminal of the controller is respectively connected to the outlet water temperature sensor, an electric power output terminal is respectively connected to the metering pump and a heating body of the pipeline heater, the electric power output terminal controls start of the metering pump and heating of the pipeline heater according to predetermined conditions, the controller operates according to the steps of the above rapid preparation method.

In the preparation device, a cost of the inlet water temperature sensor is saved, and a failure rate of the device is lowered.

For better controlling the temperature, the preparation device further comprises:
a water temperature sensor provided in the pipeline heater, wherein the water temperature sensor is connected to the signal input terminal of the controller, the controller operates according to the steps of above rapid preparation method.

For better controlling the temperature, the preparation device further comprises:
an inlet water temperature sensor provided in the water inlet device, wherein the inlet water temperature sensor is connected to the signal input terminal of the controller, the controller operates according to the steps of above rapid preparation method.

The water inlet device is water pipes, water tanks, etc.
The water outlet device is water pipes, water tanks, etc.
Preferably, the preparation device is placed in a shell; the controller is able to be operated through an operation button panel on a shell surface.

Preferably, the metering pump is an electromagnetic pump for easily controlling the water flow rate and accurately quantifying.

The pipe heater according to the present invention works at the controllable slow heating area K for avoiding uncertainty of temperature control of the conventional pipe heater due to working at the rapid heating segment and the lag of the temperature sensor, in such a manner that heating is fast, convenient and controllable. Meanwhile, by heating with one heating power of the adjacent power pair in accordance with changes of the water temperature during heating, the water temperature is increased stably, and the outlet water temperature is accurately controlled. Furthermore, because the water in the pipeline heater is heated at first, then new water is inputted into the pipeline heater for being heated, drastic temperature changes of the water and an exchange surface of the heating body, which is caused by direct contact of the cold water and the heated heating body with a high temperature, is avoided. By controlling with the adjacent power pair, problems that the water is over heated because the temperature of the heating body is too high and the water molecule structure is damaged are eliminated, in such a manner that the high quality of the original water is maintained. Therefore, not the water is tasteful, but also good health is guaranteed.

These and other objectives, features, and advantages of the present invention will become apparent from the following detailed description, the accompanying drawings, and the appended claims.

BRIEF DESCRIPTION OF THE DRAWINGS

FIG. 1 is a perspective view of a rapid preparation device of high-quality hot water according to a preferred embodiment of the present invention.

FIG. 2 is a perspective view of a water magnetizer according to the preferred embodiment of the present invention.

FIG. 3 is a schematic view according to the preferred embodiment of the present invention.

DETAILED DESCRIPTION OF THE PREFERRED EMBODIMENT

Figure 4:
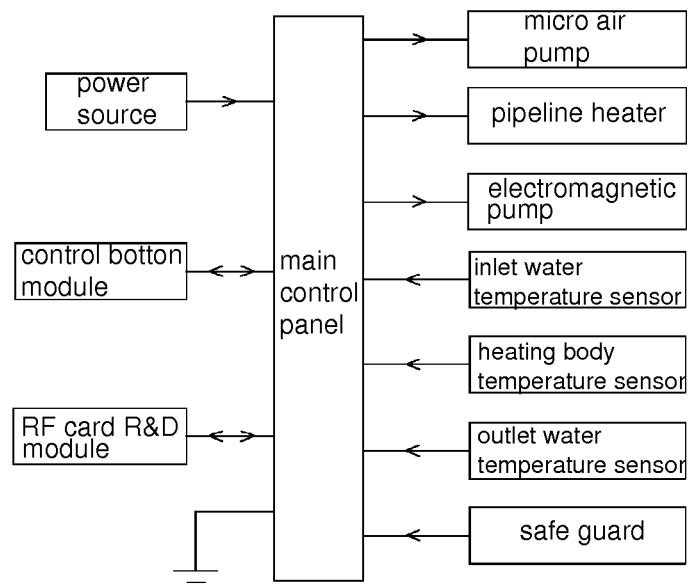
FIG. 4 is a schematic view of a main control board according to the preferred embodiment of the present invention.

Referring to the drawings, the present invention is further illustrated.

Figure 5:
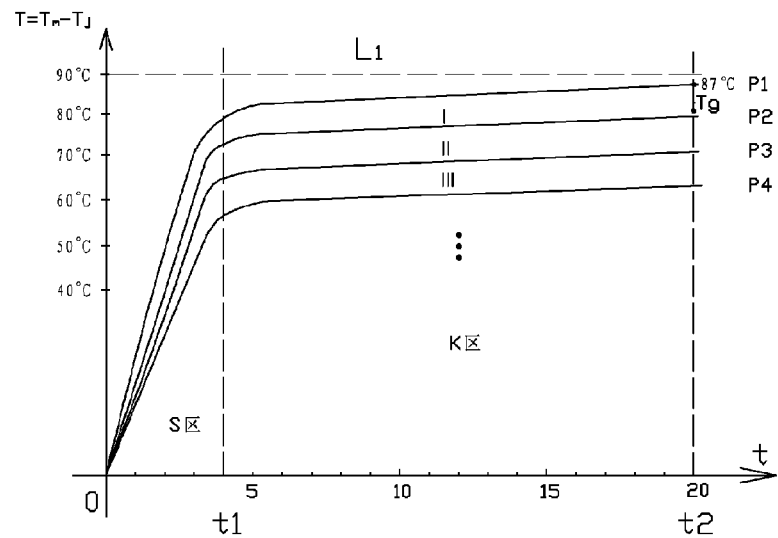
FIG. 5 is heating curves of a pipeline heater with different electric powers when a flow rate is L1 according to the preferred embodiment of the present invention.
Figure 6:
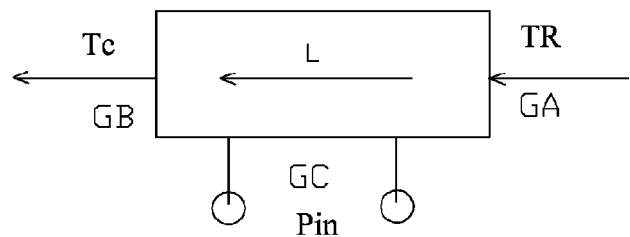
FIG. 6 is a schematic view of the pipeline heater according to the preferred embodiment of the present invention.
Figure 7:
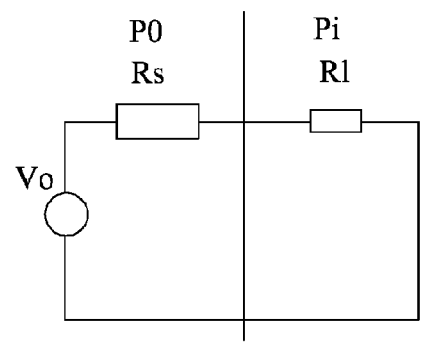
FIG. 7 is an equivalent schematic view of the pipeline heater connected to an electric grid according to the preferred embodiment of the present invention.

Referring to FIG. 2 and FIG. 5 of the drawings, heating curves of a pipeline heater are detected, wherein a flow rate of an electromagnetic pump is set to L1=5.5 ml/s, an inlet water temperature is set to Tj=10° C.; a vertical coordinate temperature T refers to a difference between a target water temperature Tm and the inlet water temperature Tj; a horizontal coordinate refers to a heating time t; the heating curves are respectively drawn with four different electric powers of P1, P2, P3 and P4 for forming a rapid liner heating area S and a slow nonlinear heating area K; the K area extends to $t_2$, wherein the $t_2$=single-time water output amount/L1.

A rapid preparation method of high-quality hot water comprises steps of:

a) detecting the inlet water temperature by an inlet water temperature sensor 2, selecting the inlet flow rate L1 and the electric power pair corresponding to a target water temperature area with a main control board according to the target water temperature and the heating curve for preparing to heat;

b) heating before inputting water, detecting a temperature of a heating body in the pipeline heater 4 by a heating body sensor 5 on the pipeline heater 4, converting the temperature to a water temperature in the pipeline heater by the main control board 12, determining a value of a heating time limitation for electric heating, and starting the pipeline heater 4 for heating with the heating time limitation in such a manner that the water in the pipeline heater is heated to a temperature close to the Tm;

c) starting the electromagnetic pump 3 by the main control board in such a manner that the water with the flow rate of L1 is outputted from a drink water tank 1 and inputted into the pipeline heater 4, heating according to one of the heating curve of the electric power pair selected in the step a) by the main control board at a same time and driving water in the pipeline heater to flow out from an output, in such a manner that the water with the flow rate of L1 is heated according to the heating curve in the K area for avoiding the S area, and obtaining water for tea with a temperature close to the target water temperature Tm from the outlet;

d) automatically adjusting the electric power by the heating body sensor 5 according to the heating curve during heating, wherein if the pipeline heater is working between the P1 and P2 heating curves of the electric power pair and the water temperature in the pipeline heater 4 is higher than the target water temperature Tm, the main control board automatically switches the heating curve towards the lower heating curve P2 of the electric power pair; if the water temperature in the pipeline heater 4 is lower than the target water temperature, the main control board automatically switches the heating curve towards the higher heating curve P1 of electric power pair; in such a manner that an outlet water temperature of the pipeline heater reaches the target water temperature Tm;

e) calculating an electrical drive pulse number of the electromagnetic pump according to a target amount of the water by the main control board, starting counting when the water is outputted, stopping heating when the electrical drive pulse number is reached, then stopping the electromagnetic pump after 2 s for stopping outputting the water, or pushing an operation button before the electrical drive pulse number is reached for stopping heating, then stopping the electromagnetic pump after 2 s for stopping outputting the water in advance; and (f) driving the water outputted from the pipeline heater to flow through a water pipe for passing a magnetic field of a water magnetizer, then inputting the water into a pipe end; mixing the water with a gas inputted through a gas pipe in the pipe end for improving freshness of the water, detecting an outlet water temperature by a water temperature sensor, and calculating, tracking and compensating performance characteristic drift due to long-time heating of the pipeline heater and water temperature decrease due to the gas inputted.

Preferably, the step b) further comprises:

detecting a heating time of the pipeline heater 4 with a half of a rated electric power, decreasing the heating time by 2 s for defining an actual heating time; starting the pipeline heater 4 for heating with the actual heating time in such a manner that the water in the pipeline heater is heated to a temperature close to a target temperature Tg.

Preferably, the step d) further comprises:

detecting the water temperature of the outlet of the pipeline heater 4 by the water temperature sensor 2 in real time, if the water temperature is higher than the Tg, automatically selecting the lower heating power P2 by the main control board for heating; if the water temperature of the outlet of the pipeline heater 4 is lower than the Tg, automatically selecting the higher heating power P1 by the main control board for heating, in such a manner that the water in the pipeline heater is heated to a temperature close to a target temperature Tg.

Preferably, the step f) is utilized for improving the quality of the water and is able to be ignored.

Referring to the FIG. 1 and FIG. 3 of the drawings, a preparation device of high-quality hot water is provided, comprising:

a main control board 12 connected to a control button panel 1;

a power source 16;

a pipeline heater 4;

an electromagnetic pump 3; and a drink water tank 11;

wherein an inlet of the pipeline heater 4 is connected to a water pipe 14 with an inlet water temperature sensor 2 through the electromagnetic pump 3, the water pipe are connected to the drink water tank 11, an output of the pipeline heater 4 is connected to a water pipe end 7 with an outlet water temperature sensor 8, a signal input terminal of the main control board 12 is respectively connected to the inlet water temperature sensor 2, the outlet water temperature sensor 8 and a heating body temperature sensor 5, an electric power output terminal of the main control board 12 is respectively connected to the electromagnetic pump 3 and the pipeline heater 4.

Preferably, the pipeline heater 4 is a rapid pipeline heater which is commercially available. A model thereof is HY-1 and a power thereof is 2200 W. Heating curves detected with different electric powers are illustrated in the FIG. 5. The heating body temperature sensor 5 is an NTC resistance sensor with a thermal response speed of 1~3 s, wherein the heating body temperature sensor 5 is closely mounted on the heating body of the pipeline heater. The pipeline heater is mounted with a water inlet under a water outlet. An inlet water temperature sensor 2 is mounted in a cavity of a pipe joint 14-1. The pipe joint 14-1 is mounted on a side wall of the drink water tank by a screw. A CPU of the main control board 12 is STC12C5A32S2 with a RF (radio frequency) card reading and writing module 13 mounted thereon. Safety guards such as a level switch and auto power off module are mounted in the drink water tank 11. The water pipe 14 is a food grade silicone tube.

For improving the water quality, a water magnetizer 6 is connected to an outlet of the pipe heater, and an air tube 9 is vertically mounted at an outlet end of the water magnetizer.

By utilizing the water magnetizer and the air tube with a micro air pump, freshness and an oxygen content of the hot water are further improved. Utilizing the hot water with high-quality tea, coffee, etc. ensures and improves a brewing quality of the tea and the coffee, so as to provide relaxation and joy after intense work to.

The water pipe 14 comprises:

the pipe joints 14-1;

a pipe 14-2;

a pipe 14-3; and a pipe 14-4;

wherein connectors 18 are provided on both ends of the electromagnetic pump and the pipeline heater for connecting the water pipe 14.

Referring to the FIG. 2 of the drawings, the water magnetizer 6 comprises:

a through tube provided at a center of the water magnetizer 6;

N and S Nd—Fe—B magnet blocks 6-2 respectively mounted in an upper slot and a lower slot of an H-shaped skeleton 6-1.

An upper air inlet 7-1 of the pipe end 7 is connected to the air pipe 9. The air pipe 9 is connected to an outlet of the micro air pump 10. The micro air pump 10 is connected to the electric power output terminal of the main control board 12. The water temperature sensor 8 is mounted on a sidewall induction port 7-4 of the pipe end. A bottom end of the pipe end is the water outlet 7-2. A water inlet 7-3 on another side wall of the pipe end 7 is connected to the pipe 14-4 at the outlet of the water magnetizer 6. Air inputted through the air pipe and the magnetized water from the water magnetizer is mixed in the pipe end, and the mixed water is outputted from the outlet 7-2 for being utilized.

A first end of the pipe 14-2 is directly and flexibly connected to the pipe joint 14-1, a second end thereof is connected to a water inlet connector 18 of the electromagnetic pump 3. A water outlet connector 18 of the electromagnetic pump 3 is flexibly connected to a water inlet connector 18 of the pipe heater by the pipe 14-3. A water outlet connector 18 of the pipeline heater is flexibly connected to a first end of the pipe 14-4. A second end of the pipe 14-4 passes through the through hole of the skeleton 6-1 and is connected to the pipe end 7 with the water temperature sensor 8 mounted thereon. The signal input terminal of the main control board 12 is respectively connected to the inlet water temperature sensor 2, the outlet water temperature sensor 8 and a heating body temperature sensor 5. An electric power output terminal of the main control board 12 is respectively connected to the electromagnetic pump 3 and the pipeline heater 4.

A cup with tea leaves is placed under the water outlet 7-2 of the pipe end 7 of the preparation device. When the power source 16 is turned on, screen 1-1 on the control button panel 1 displays a water temperature and a water amount. If the water temperature of 80° C. and the water amount of 100 ml don't meet requirements, the water temperature is able to be set by pressing a temperature key 1-6, and the water amount is able to be set by pressing a mode key 1-2, in such a manner that the water temperature is set to 95° C. and the water amount is set to 150 ml. If a target water temperature is 96° C. or 94° C., an increase key 1-3 or a decrease key 1-4 should be pressed for slightly increasing or decreasing the water temperature. Then an operation key 1-5 is pressed in such a manner that the main control board works according to the steps a), b), c), d), and e). As a result, water will flow out from the water outlet 7-2 for tea, wherein a temperature thereof is 96° C. or 94° C. and an amount thereof is 150 ml.

Preferably, an individual RF card (which is not illustrated in the drawings) with ancillary data such as the water temperature and the water amount is placed at a RF induction area of the RF card reading and writing module 13. Then the operation key 1-5 is pressed in such a manner that the main control board works according to the steps a), b), c), d), and e). As a result, water with the water temperature and the water amount determined by the RF card will flow out from the water outlet 7-2 for tea. At the meantime, the water temperature and the water amount is digitally displayed on the screen 1-1 of the control button panel.

The water temperature of the rapid preparation device is between a room temperature and 98° C. With the heated water, a temperature of 95° C. is suitable for tea, and a temperature of 65° C. is suitable for milk powder. Or the water is able to be directly drunk without being heated. However, water in the drinking water tank 11 should be of high quality and in line with national standards, or should be bottled water 17.

According to the present invention, water with a temperature of 70~85° C. for green tea such as Longjing, and water with a temperature of 90~98° C. for red tea such as Da Hong Pao are obtained, wherein the water meets requirements of a tea art.

Only effects of changes of m on a capture formula $T=T_{cm}-T_r+x$ are illustrated as follows.

Figure 8:
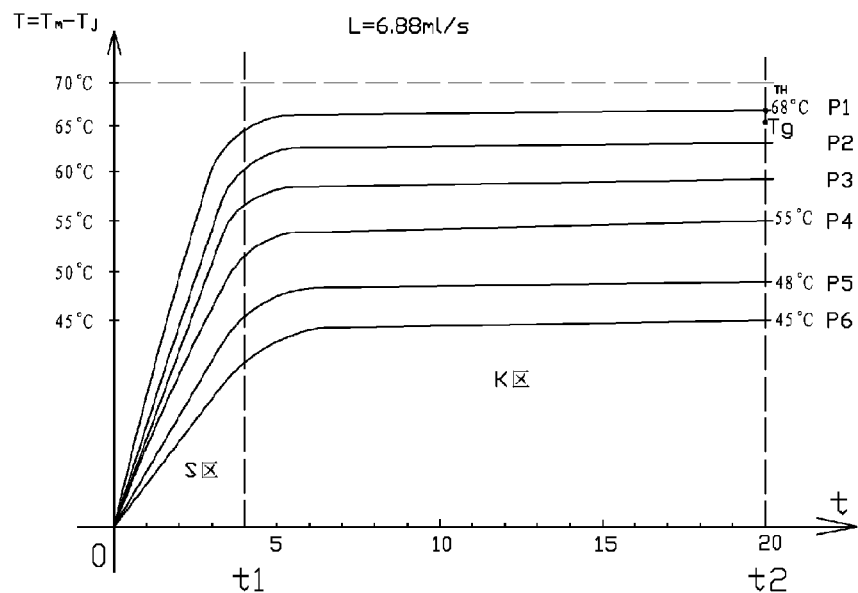
FIG. 8 is heating curves of the pipeline heater with different electric powers when the flow rate is L1 according to the preferred embodiment of the present invention.

Referring to the FIG. 8 of the drawings, heating curves of the Hy-1 pipeline heater are illustrated, wherein during detecting, the ambient temperature is 25° C., voltage $V_o$ is AC 220V, a grid internal resistance $R_s$ is 2Ω, a thick-film resistors $R_1$ of the pipeline heater is 20Ω, a flow rate is $L=L_0=6.88$ ml/s, a heat capacity is C=4.18 J, and a basic water temperature during detecting is 15° C. Predetermined powers $P_6=1512.5$ w, $P_5=1650$ w and $P_4=1787.5$ w are respectively inputted. At a time of $t_2$, heating values are respectively $T_6=45°$ C., $T_5=48°$ C., $T_4=55°$ C.

According to $T_{ic}-T_R=\eta_i \times P_i/(4.18\times L)$ and the above $P_6$, $P_5$ and $P_4$, $\eta_6=0.856$, $\eta_5=0.837$ and $\eta_4=0.885$ are able to be obtained by calculating under experiment conditions.

If an actual working environment doesn't match with the experiment conditions (for example, the ambient temperature is not 25° C.), $P_{i\Sigma}$ under the experiment conditions is changed, which leads to drift of the $\eta_i$ detected under the experiment conditions. When the drift reaches a certain value, for example, $\Delta\eta_i=0.03$, then by $\eta_i'=\eta_i-\Delta\eta_i$, $\eta_6'=0.826$, $\eta_5'=0.807$ and $\eta_4'=0.855$ are able to be obtained. According to the equation 2, because of the changes of the $\eta_i$, the heating value at $t_2$ with the power $P_i$ is $T_i'=T_i\cdot\eta_i'/\eta_i$, wherein $T_6'=43.5°$ C., $T_5'=46.3°$ C., and $T_4'=53.1°$ C. are calculated.

Similarly, by $\eta_i'=\eta_i+\Delta\eta_i$, $\eta_6'=0.886 \eta_5'=0.867$ and $\eta_4'=0.915$ are able to be obtained, wherein a drift direction increases the According to the equation 2, because of the changes of the $\eta_i$, the heating value at $t_2$ with the power $P_i$ is $T_i''=T_i\cdot\eta_i''/\eta_i$, wherein $T_6''=46.5°$ C., $T_5''=49.3°$ C., and $T_4''=56.1°$ C. are calculated.

If the change of the $\eta_i$ is ignored, when the target water temperature is $T_{cm}=62.5°$ C., the inlet water temperature is $T_R=15°$ C., and the heating value is $T=T_{cm}-T_R=47.5°$ C., the heating curve is captured according to the values of $T_6=45°$ C., $T_5=48°$ C. and $T_4=55°$ C. at time $t_2$. After capturing, $T_6=45°$ C.$<T=47.5°$ C.$<T_5=48°$ C. A corresponding adjacent power pair of the $P_6$ and the $P_5$ is selected and $T_c$ is controlled by switching between the $P_6$ and the $P_5$ in such a manner that the $T_c$ reaches the target water temperature $T_{cm}=62.5°$ C.

Due to drift of actual conversion efficiency according to the $\eta_i$ obtained in the experiment, the heating value $T_i$ is necessary to be compensated. Accordingly, with the $\eta_i'$ and the $\eta_i''$, compensation is illustrated as follows.

When $\eta_i=\eta_i''$, $T_6''=46.6°$ C.$<T=47.5°$ C.$<T_5''=49.7°$ C.

When $\eta_i=\eta_i'$, $T_6'=43.5°$ C.$<T=46.3°$ C.$<T_5'=47.5°$ C.

Therefore, when the $\eta_i$ changes to the $\eta_i'$, the $T_{cm}=62.5°$ C. during heating is controlled by the heating power pair of the $P_6$ and the $P_5$. A temperature control difference between a target heating value and the outlet water temperature exists during an entire heating procedure of the pipeline heater, wherein the temperature control difference is not able to be eliminated and is $y=T_{cm}-T_5'-T_5=62.5-46.3-15=1.2°$ C. If the outlet heating value is lower than the target outlet heating value, controlling by the $P_6$ and the $P_5$ is impossible.

As a result, the T is captured again after the time $t_1$, and a new heating value is calculated as $T+y=47.5+1.2=48.7°$ C. Then $T=48.7°$ C. is capture by utilizing the $T_6$, the $T_5$ and the $T_4$. After capture, $T_5=48°$ C.$<T=48.7°$ C.$<T_4=55°$ C., a new corresponding captured adjacent heating power pair is $P_5$ and $P_4$. According to $\eta_i=\eta_i'$, $T_5'=46.3°$ C.$<T=47.5°$ C.$<T_4'=53°$ C.

Under a condition of $T_{cm}=62.5°$ C., $T_R=15°$ C., and $\eta_i=\eta_i'$, in consideration of the y factor, the pipeline heater captures the $P_5$ and the $P_4$ from the $P_6$, the $P_5$ and the $P_4$ with the $T=48.7°$ C. Switching between the adjacent power pair of the $P_5$ and the $P_4$ improves accuracy of temperature control of the $T_{cm}=62.5°$ C. under a condition of $\eta_i=\eta_i'$.

Referring to FIG. 5 of the drawings, heating characteristics of the Hy-1 pipeline are illustrated, wherein during detecting, $TH_1=87°$ C., the ambient temperature is 25° C., voltage $V_o$ is AC 220V, a power network internal resistance $R_s$ is 2Ω, a thick-film resistors $R_1$ of the pipeline heater is 20Ω, a flow rate is $L=L_0=5.5$ ml/s, a heat capacity is C=4.18 J, and a basic water temperature during detecting is 10° C.

During actual utilization: $T_R=25°$ C., $T_{cm}=85°$ C., x=0, temperature control accuracy $C_p$ of the pipeline heater is 2° C., and an actual inlet water temperature is 10° C.

During the step a), the temperature value is $T=T_{cm}-T_R+x=60°$ C.<$TH_1$, $L_1=5.5$ ml/s is determined, and one heating curve graph of the pipeline heater is utilized.

During the step b), the heating value T=60° C. is captured with the $T_i$ on the T coordinate as illustrated in the FIG. 5. After capture, the step e) is provided. The outlet water temperature is $T_c=T+T_R=70°$ C. after a time of $t_1$. Then the step c) is provided. After a time of $t_1$, $y=T_{cm}-T_c=15°$ C.>$C_p$ and the x is replaced by x+y=15. The heating value of the capture formula obtained in the step a) is $T=T_{cm}-T_R+x=75°$ C.<$TH_1$. The flow rate is determined as $L=L_1=5.5$ ml/s. During the step b), the heating value T=75° C. is captured with the $T_i$ on the T coordinate as illustrated in the FIG. 5. After capture, the step e) is provided. The outlet water temperature is $T_c=T+T_R=85°$ C. after a time of $t_1$, in such a manner to meet requirements of temperature control with the target temperature $T_{cm}=85°$ C.

Because of max power limitation of the $P_i$, a highest heating value of the $TH_j$ is determined by the predetermined flow rate $L_j$ (j=0, 1, 2, 3, . . . n). As a result, different detected values of the pipeline heater with different flow rates, wherein the flow rates of the pipeline heater are respectively set to $L_j$ (j=0, 1, 2, 3, . . . n). During setting the water flow $L_j$, the heating curves reflecting a relationship of time and temperatures with different heating powers $P_i$ of the pipeline heater are detected and drawn when the flow rate of the pipeline heater is set to $L_j$, wherein a vertical coordinate temperature T refers to a difference between the outlet water temperature $T_c$ and the inlet water temperature $T_j$; a horizontal coordinate refers to the heating time t; with different heating powers $P_i$, a rapid liner heating area of the heating curve forms an S area and a slow nonlinear heating area forms a K area. At the meantime, a max power of the pipeline heater, the heating time $t_2$, and highest heating value $TH_j$ with the flow rate $L_j$ are determined, in such a manner that a series of heating curves under different flow rates are formed.

For example: another heating curve graph of the pipeline heater is added, wherein $L_0=6.88$ ml/s, $P_0=2200$ w, the inlet water temperature $T_R=15°$ C. Referring to the FIG. 8 of the drawings, heating curves of the Hy-1 pipeline heater with different electric powers $P_i$ are illustrated, wherein a highest water outlet temperature $TH_0=68°$ C.

When using environment changes and the highest heating temperature becomes below 68° C., the heating temperature is able to be controlled according to the FIG. 5, or by the above method as illustrated in the FIG. 8. Therefore, temperature control is able to be provided by selecting one of the heating curves with the different flow rates.

Controlling with more than one heating curve graph of the pipeline heater widens a selecting range of the outlet water temperature and the flow rate, in such a manner that the preparation device adapts to requirements of the user as much as possible. For example, water supply is provided with a small flow rate and a high temperature, or with a low temperature and a high flow rate.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rapid preparation method of high-quality hot water, wherein a heating curve thereof is based on a heating curve of a pipeline heater; a flow rate of an electromagnetic pump is set to L1; a vertical coordinate temperature T refers to a difference between a target water temperature Tm and an inlet water temperature $T_j$; a horizontal coordinate refers to a heating time t; the heating curves are respectively drawn with different electric powers of P1, P2, P3, P4, etc. for forming a rapid liner heating area S and a slow nonlinear heating area K; the K area extends to $t_2$, wherein the $t_2$=single-time water output amount/L1; the adjacent heating curves are also called an electric power pair, an area enclosed in the K area by the electric power pair is a heating area of the target water temperature;

wherein the rapid preparation method comprises steps of:
a) detecting the inlet water temperature from the electromagnetic pump by an inlet water temperature sensor, selecting the electric power pair corresponding to a target water temperature area with a main control board according to the target water temperature and the heating curve for preparing to heat;
b) heating before inputting water, detecting a temperature of a heating body in the pipeline heater by a heating body sensor on the pipeline heater, converting the detected temperature to a water temperature in the pipeline heater by the main control board, or detecting a difference between the water temperature and the target water temperature by a temperature sensor, determining a value of a heating time limitation for electric heating, and starting the pipeline heater for heating with the heating time limitation in such a manner that the water in the pipeline heater is heated to a temperature close to the Tm;
c) starting the electromagnetic pump by the main control board in such a manner that the water with the flow rate of L1 is outputted from a drink water tank and inputted into the pipeline heater, heating according to one of the heating curve of the electric power pair selected in the step a) by the main control board at a same time in such a manner that the water with the flow rate of L1 is heated according to the heating curve in the K area for avoiding the S area, and obtaining water for tea with a temperature close to the target water temperature from an outlet;
d) automatically adjusting the electric power by the heating body sensor according to the heating curve during heating, wherein if the pipeline heater is working with the target water temperature between the heating curves of the electric power pair selected in the step a) and the water temperature in the pipeline heater is higher than the target water temperature, the main control board automatically switches the heating curve towards the lower heating curve of the electric power pair; if the water temperature in the pipeline heater is lower than the target water temperature, the main control board automatically switches the heating curve towards the higher heating curve of electric power pair; in such a manner that an outlet water temperature of the pipeline heater reaches the target water temperature Tm; and e) calculating an electrical drive pulse number of the electromagnetic pump according to a target amount of the water by the main control board, starting counting when the water is outputted, stopping heating when the electrical drive pulse number is reached, then stopping the electromagnetic pump after 2 s for stopping outputting the water, or pushing an operation button before the electrical drive pulse number is reached for stopping heating, then stopping the electromagnetic pump after 2 s for stopping outputting the water in advance.

2. A rapid preparation method of high-quality hot water, comprising steps of:

a) calculating a temperature difference between an inlet water temperature and an predetermined outlet water temperature, determining an adjacent heating power pair from heating curves of the pipeline heater according to the temperature difference and a predetermined flow rate, wherein the heating power pair is corresponding to one of time points in a slow nonlinear heating area K, then selecting the heating power pair for preparing to heat water in the pipeline heater; and b) inputting the water with the predetermined flow rate into the pipeline heater, heating with one of the heating power pair selected in the step a) in such a manner that the water in the pipeline heater is heated according to the K area of the pipeline heater, obtaining the water with the target water temperature from an outlet;

wherein a method for defining the heating curve when a flow rate of the pipeline heater is constant comprises a step of: respectively detecting and drawing the heating curves reflecting a relationship of time and temperatures with different heating powers of the pipeline heater when the flow rate of the pipeline heater is set to L1, wherein a vertical coordinate temperature T refers to a difference between an outlet water temperature Tm and an inlet water temperature $T_j$; a horizontal coordinate refers to a heating time t; with different heating powers, a rapid liner heating area of the heating curve forms an S area and the slow nonlinear heating area forms the K area.

3. The rapid preparation method, as recited in claim 2, further comprising a step of:

c) detecting a water temperature in the pipeline heater at first, calculating a heating time with the selected heating power according to a difference between the water temperature and the target water temperature as well as a volume of the water in the pipeline heater, decreasing the heating time by a certain time for obtaining an actual heating time, setting the heating power according to the actual heating time for heating the water in the pipeline heater, then heating according to the step b).

4. The rapid preparation method, as recited in claim 2, further comprising a step of:

d) during heating, selecting the lower heating power of the heating power pair in the step a) for heating if the water temperature in the pipeline heater is higher than the target water temperature; selecting the higher heating power of the heating power pair for heating if the water temperature in the pipeline heater is lower than the target water temperature; in such a manner that an outlet water temperature of the pipeline heater is close to the target water temperature.

5. The rapid preparation method, as recited in claim 2, wherein the heating time detected in the K area is $t_2$, wherein the $t_2$=single-time water output amount/L1.

6. The rapid preparation method, as recited in claim 2, wherein a range of a temperature difference of the adjacent heating curves in the K area is 3~7° C.

7. A rapid preparation method of high-quality hot water, comprising steps of:

a) calculating a heating variable T according to $T=T_{cm}-T_R+x$, wherein the $T_R$ and the x are predetermined constants, then determining a flow rate $L_j$ according to a serious of heating curves of a pipeline heater, wherein the $L_j$ satisfies $T \leq TH_j$;

b) inputting water with the flow rate $L_j$ into the pipeline heater, then obtaining the heating variable T according to a heating curve pair of the pipeline heater, wherein the heating curve pair is corresponding to the $L_j$, determining an adjacent heating power pair from heating curves of the pipeline heater, wherein the heating power pair is corresponding to one of time points in a slow nonlinear heating area K, then heating with one heating power of the heating power pair; and c) detecting a water temperature $T_c$ in the step b) from a water outlet of the pipeline heater; calculating a temperature difference between a target water temperature $T_{cm}$ of the water outlet and the water temperature of the water outlet when $t \geq t_1$, wherein the temperature difference $y=T_{cm}-T_c$; comparing the y to a max allowable discrepancy $C_p$ of the target water temperature, increasing the y by the original compensation value x when $|y|>C_p$ for obtaining a new compensation value x, then providing the step a) and the step b); providing the step b) if $|y|<C_p$;

wherein a method for defining the heating curve comprises steps of: respectively setting the flow rate of the pipeline heater to $L_j$, wherein j=0, 1, 2, 3, . . . n, detecting and drawing the heating curves reflecting a relationship of time and temperatures with different heating powers $P_i$ of the pipeline heater, wherein a vertical coordinate temperature T refers to the heating variable of the outlet water temperature $T_c$ and the inlet water temperature $T_R$; a horizontal coordinate refers to a heating time t; with the different heating powers, a rapid liner heating area of the heating curve forms an S area and the slow nonlinear heating area forms the K area.

8. The rapid preparation method, as recited in claim 7, wherein the step b) comprises a step of:

d) detecting a water temperature $T_{sh}$ in the pipeline heater at first, calculating a heating time with the selected heating power according to a difference between the target water temperature $T_{cm}$ and the $T_{sh}$ as well as a volume of the water in the pipeline heater, decreasing the heating time by a certain time for obtaining an actual heating time, setting the heating power according to the actual heating time for heating the water in the pipeline heater, in such a manner that the water temperature in the pipeline heater is close to a temperature corresponding to an end time $t_1$ of a rapid heating segment.

9. The rapid preparation method, as recited in claim 7, wherein a starting time of the x in the step c) is $t_1'=t_1 (T_{cm}-T_{sh})/(T_{cm}-T_R)$.

10. The rapid preparation method, as recited in claim 7, further comprising a step of:

e) during heating in the step b), selecting the lower heating power of the heating power pair in the step b) for heating if the water temperature in the pipeline heater is higher than the target water temperature; selecting the higher heating power of the heating power pair for heating if the water temperature in the pipeline heater is lower than the target water temperature; in such a manner that an outlet water temperature of the pipeline heater is close to the target water temperature.

\* \* \* \* \*